May 7, 1935.  M. O. MILLER  2,000,470
PHOTOGRAPHY
Filed Feb. 16, 1931
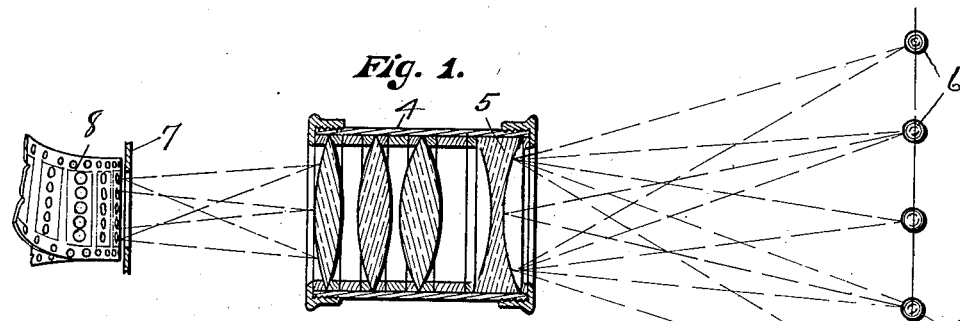
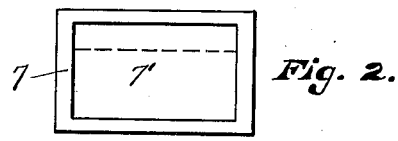
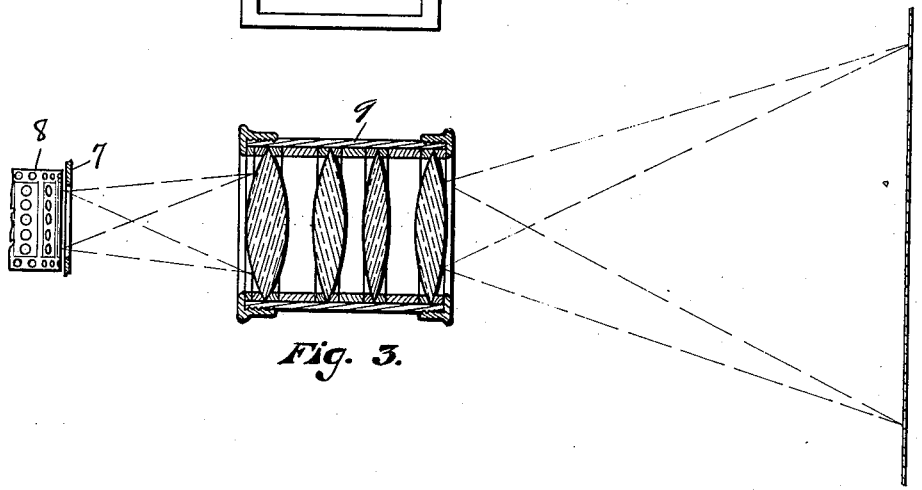
Max O. Miller
INVENTOR
BY
ATTORNEY Patented May 7, 1935

2,000,470

UNITED STATES PATENT OFFICE 2,000,470

PHOTOGRAPHY

Max O. Miller, Los Angeles, Calif.

Application February 16, 1931, Serial No. 516,029

2 Claims. (Cl. 88—16)

In taking pictures for use on the large screens, that is, on a screen which is about twenty-five percent higher and a hundred percent wider than the standard screen, the difficulty has been to take in sufficient area without placing the camera an unsatisfactory distance from the objects or scene being taken, and this distance prevents securing a clear and distinct picture.

By my improved method I am able to take in a greater area with the camera at relatively close range and then to project the picture on to the larger screen with good results.

I accomplish this by using an aperture plate with the aperture opening reduced in height about twenty-five per cent, without reducing the length of said opening. It is understood that the aperture opening determines the size of the frame on the film.

I also substitute a double concave spherical lens in the front of the lens barrel for the convexed lens now used. This makes it possible, without removing the camera, to take in a greater area without distortion, as is illustrated on the drawing accompanying this application.

The focal length of the present standard lens, if two inches, I reduce to one and a half inches, or less, which will reduce the size of the figures or objects on the film. The diameter of the lens is retained the same as at present. Thus by placing a concaved lens in front, or as the view lens, a wider angle of view is taken in and photographed, and by reducing the focal length of the lens, the objects are uniformly reduced without any cramping or distortion thereof, and then, again, by placing a double concaved or minus lens in front, I secure an illusionary relief effect not before secured. This is due to the fact that the double concaved lens without a focal point receives the object with the appearance of its being suspended in the air.

In projecting the pictures thus taken with the concaved spherical lens in front and the shorter focal length, through an aperture opening which is reduced in height only, in order to cover the enlarged screen, I reduce the focal length of the lens in the projecting machine by one-half. This process will reproduce the picture double the size in width and height.

In order to more fully explain my invention, I have shown on the accompanying sheet of drawings diagrammatically my lens for taking a picture and the lens as reduced in focal length for projecting the picture taken.

Figure 1 is a horizontal sectional view through a lens embodying my invention, with the aperture plate and film in place and with the objects being taken;

Figure 2 is an elevation of an aperture plate, with a broken line showing how much I reduce the height thereof; and Figure 3 is a horizontal sectional view through a projecting lens, showing the screen, the aperture plate and the film.

Referring now to the drawing in detail, 4 designates as a whole a taking lens in which I place a double concaved or minus lens 5 in the front for the purpose of enlarging the scope of the field taken in. The scene being taken is composed of five spaced objects, designated 6, 6. The aperture plate is shown in place at the film and is designated 7, while the film is designated 8, said film showing the relatively narrow, vertically, frames, with the five objects shown thereon. With the usual convexed lens in front of said lens barrel the outer objects 6, 6, would not be included in the picture without moving the camera further away from the objects. By reducing the vertical height of the opening in the aperture plate 7, the vertical height of the picture taken is cut down so that when it is projected in a magnified form it will not be too high for the screen.

Referring to Fig. 3, I have shown a lens, designated as a whole 9, but with its focal length cut in half. That is, if the lens was a two inch lens, it is reduced to an inch as its focal length, and this results in projecting a picture which is double the width and height. The opening in the aperture plate is reduced by twenty-five per cent in height only. The same aperture plate 7 is used, as in taking the picture. In Fig. 2, the broken line 7' designates the reduction in the vertical height of the opening in said aperture plate. The film is also designated the same.

The ordinary or standard photographic lens in use today has an angular field of view of about sixty degrees. In order to increase the angular field of view to ninety degrees effective, I have discovered that by using a concaved lens, either double concaved or single concaved, in front, or as the first lens element, that this angular field of view is increased to ninety degrees, according to the lens. The balance of the lens system is optional according to the type of lens desired for different purposes. It will be understood, of course, that whenever a concaved lens is used as the first or front lens element, that the balance of the lens system is adjusted or constructed to give clear picture, but this involves only the usual skill used in making lenses. My invention has to do with the use of a concaved lens in the front for the purpose of increasing the field taken into the picture without moving the camera, and while I have shown and described certain embodiments of my invention, I do not limit my invention to the details here shown for explanatory purposes, except as I may be limited by the hereto appended claims.

I claim:

1. The process of taking and projecting pictures which consists in photographing an object through a conventional camera lens with a concaved spherical lens in front of the camera lens to increase the field thereof without increasing the object distance, using an aperture plate having an aperture reduced vertically to prevent exposure of a portion of the standard film frame area, and then projecting said picture through a double convexed spherical lens having a focal length less than that of the lens usually used at the same screen distance and through an aperture plate having the same size of aperture as that in the aperture plate through which the picture was taken.

2. The process of taking and projecting motion pictures which consists in photographing the object or scene through a conventional camera lens with a double concaved spherical lens in front of the camera lens to increase the field thereof without increasing the object distance, using an aperture plate having an aperture reduced vertically to prevent exposure of a portion of the standard film frame area, and then projecting said picture through a double convexed spherical lens having a focal length less than that of the lens usually used at the same screen distance and through an aperture plate having the same size of aperture as that in the aperture plate through which the picture was taken.

MAX O. MILLER.